United States Patent
Magri et al.

(10) Patent No.: US 10,790,924 B2
(45) Date of Patent: Sep. 29, 2020

(54) METHOD AND NODE FOR FACILITATING OPTICAL SUPERVISORY CHANNEL COMMUNICATIONS IN AN OPTICAL NETWORK

(71) Applicant: Telefonaktiebolaget LM Ericsson (publ), Stockholm (SE)

(72) Inventors: Roberto Magri, Montignoso (IT); Fabio Falconi, Pisa (IT)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/334,924

(22) PCT Filed: Sep. 23, 2016

(86) PCT No.: PCT/EP2016/072745
§ 371 (c)(1),
(2) Date: Mar. 20, 2019

(87) PCT Pub. No.: WO2018/054491
PCT Pub. Date: Mar. 29, 2018

(65) Prior Publication Data
US 2019/0215092 A1  Jul. 11, 2019

(51) Int. Cl.
*H04B 10/00* (2013.01)
*H04J 14/02* (2006.01)
(Continued)

(52) U.S. Cl.
CPC ........ *H04J 14/0241* (2013.01); *H04B 10/077* (2013.01); *H04B 10/0773* (2013.01); *H04B 10/0775* (2013.01); *H04J 14/0227* (2013.01)

(58) Field of Classification Search
CPC .. H04B 10/271; H04B 10/272; H04J 14/0275
See application file for complete search history.

(56) References Cited

U.S. PATENT DOCUMENTS

| | | |
|---|---|---|
| 2004/0161235 A1 | 8/2004 | Halgren et al. |
| 2013/0089336 A1 | 4/2013 | Dahlfort et al. |

(Continued)

FOREIGN PATENT DOCUMENTS

WO  2016005008 A1  1/2016

*Primary Examiner* — Daniel G Dobson
(74) *Attorney, Agent, or Firm* — Coats & Bennett, PLLC

(57) ABSTRACT

A method (100) for facilitating Optical Supervisory Channel (OSC) communications between a main site and a plurality of remote sites in an optical network is disclosed. The main and remote sites are comprised within a Radio Access Network and the main and remote sites are connected via a point to multipoint optical infrastructure. The method comprises receiving an OSC signal on an OSC from the main site (120), sequentially routing OSC signals on the OSC to each of the remote sites in a daisy chain configuration (140) and returning an OSC signal received on the OSC from a last of the remote sites in the daisy chain configuration to the main site (160), the OSC being transported over the point to multipoint optical infrastructure (170). Also disclosed are a method (500) for performing OSC communications in an optical network, a hub node (300, 400), a remote site node (600, 800) and a system (900) for communications in an optical network.

15 Claims, 10 Drawing Sheets

(51) Int. Cl.
*H04B 10/077* (2013.01)
*H04J 14/00* (2006.01)

(56) References Cited

U.S. PATENT DOCUMENTS

2014/0270772 A1* 9/2014 Lutgen ................. H04B 10/272
 398/66
2020/0008128 A1* 1/2020 Lewis ................. H04J 14/0291

* cited by examiner

METHOD AND NODE FOR FACILITATING OPTICAL SUPERVISORY CHANNEL COMMUNICATIONS IN AN OPTICAL NETWORK

TECHNICAL FIELD

The present disclosure relates to a method for facilitating Optical Supervisory Channel (OSC) communications in an optical network. The present disclosure also relates to a node for facilitating OSC communications in an optical network and to a system for communications in an optical network.

BACKGROUND

In cellular communication networks, a Radio Access Network (RAN) comprises a plurality of radio base stations (RBSs), each RBS providing radio network coverage over a coverage area or cell. In traditional architectures, both radio and baseband processing are performed in the RBS, which outputs an Ethernet signal which is then transported to a core network segment using microwave and/or optical fibre. In some implementations, RBSs may be separated into one or more radio units and one or more baseband processing units, enabling, among other advantages, the optimising of radio unit placement. The radio units may be referred to as Remote Radio Units (RRUs) or as Radio Equipments (REs) and are located in remote sites. The baseband processing units may be referred to as Digital Units (DUs) or as Radio Equipment Controllers (RECs) and each may be located in a main site. The communication links between REs and RECs in such deployments are collectively referred to as the Mobile Fronthaul (MFH) or fronthaul. The Common Public Radio Interface (CPRI) specifies an interface protocol for RBS communication between REs and RECs.

The fronthaul is often implemented as an optical network, with a point to multipoint optical infrastructure connecting a single REC to its associated REs. In order to reduce both capital and operational expenditure, single fiber working may be preferred, according to which bidirectional optical transmission is carried on a single optical fiber, using different wavelengths for upstream and downstream communications. A typical topology used in such networks is the "tree topology" or "hub and spoke". As illustrated in FIG. 1, a fronthaul tree topology 2 is characterised by a single fiber connection 4 between the REC site 6 and a remote hub or splitter site 8, and a plurality of dedicated single fiber connections or branches 10 providing connectivity between the hub 8 and REs 12.

The fronthaul carries radio data, e.g. CPRI, signals in a transparent manner, and additional Optical Supervisory services are required to provide for Operations and Maintenance (O&M) connectivity to the REs. The Optical Supervisory Channel (OSC) is a dedicated communications channel used for remote management of optical network elements, and may be used in the fronthaul to provide the required additional optical supervisory services for REs. An OSC to each RE is usually established using dedicated OSC transceivers at each end point of the channel, the OSC transceivers using additional wavelengths outside the band used for CPRI signals. The OSC wavelengths may be Dense Wavelength Division Multiplexing (DWDM) wavelengths, or for a relatively small number of connections, the wavelengths may be Coarse Wavelength Division Multiplexing (CWDM) wavelengths.

When implementing OSC communications in the fronthaul, it is desirable to provide a scalable solution which can easily adapt to the addition of new REs, while also limiting both the cost and the complexity of the deployment.

SUMMARY

According to a first aspect of the present disclosure, there is provided a method for facilitating Optical Supervisory Channel (OSC) communications between a main site and a plurality of remote sites in an optical network, wherein the main and remote sites are comprised within a Radio Access Network and wherein the main and remote sites are connected via a point to multipoint optical infrastructure. The method comprises receiving an OSC signal on an OSC from the main site, sequentially routing OSC signals on the OSC to each of the remote sites in a daisy chain configuration, and returning an OSC signal received on the OSC from a last of the remote sites in the daisy chain configuration to the main site. The OSC is transported over the point to multipoint optical infrastructure.

According to examples of the present disclosure, the OSC signal may be a data signal carrying OSC information on a wavelength reserved for OSC communications. According to examples of the present disclosure, the OSC signal may be modified, for example having data added or being transmitted on different reserved wavelengths, during its routing along the daisy chain.

According to examples of the present disclosure, sequentially routing OSC signals on the OSC to each of the remote sites in a daisy chain configuration may comprise forwarding an OSC signal on the OSC to an nth remote site in the daisy chain configuration, receiving an OSC signal from the nth remote site in the daisy chain configuration, and forwarding the received OSC signal from the nth remote site to an n+1th remote site in the daisy chain configuration without returning the received OSC signal to the main site.

According to examples of the present disclosure, the optical network may comprise a hub node. The point to multipoint optical infrastructure may comprise a bidirectional single fiber connection between the main site and the hub node and bidirectional single fiber connections between the hub node and each of the remote sites. According to examples of the present disclosure, the method may be performed by the hub node.

According to examples of the present disclosure, the main site may comprise a Radio Equipment Control (REC) site and the remote sites may comprise Radio Equipment (RE) sites.

According to examples of the present disclosure, receiving the OSC signal on the OSC from the main site may comprise receiving the OSC signal on a first wavelength. Sequentially routing OSC signals on the OSC to each of the remote sites in a daisy chain configuration may comprise forwarding an OSC signal received on the OSC from an nth remote site to an n+1th remote site in the daisy chain configuration on the same wavelength on which the OSC signal was received from the nth remote site, the wavelength being one of the first wavelength or a second wavelength.

According to examples of the present disclosure, returning an OSC signal received on the OSC from a last of the remote sites in the daisy chain configuration to the main site may comprise returning the OSC signal to the main site on a third wavelength.

According to examples of the present disclosure, sequentially routing OSC signals on the OSC to each of the remote sites in a daisy chain configuration may comprises forwarding an OSC signal on the OSC to an nth remote site in the daisy chain configuration on the first wavelength, receiving an OSC signal on the OSC from the nth remote site in the daisy chain configuration on the second wavelength, and forwarding the OSC signal received on the OSC from the nth remote site to an n+1th remote site in the daisy chain configuration on the second wavelength.

According to examples of the present disclosure, the method may further comprise receiving a Dense Wavelength Division Multiplexing (DWDM) signal from the main site and forwarding at least a part of the DWDM signal to the remote sites, the DWDM signal being transported over the point to multipoint optical infrastructure.

According to examples of the present disclosure, forwarding at least a part of the DWDM signal to the remote sites may comprise, for an n+1th remote site, adding an OSC signal received on the OSC from an nth remote site to the at least a part of the DWDM signal received from the main site for forwarding to the n+1th remote site.

According to examples of the present disclosure, the method may further comprise receiving a DWDM signal from at least one of the remote sites and forwarding the received DWDM signal received from at least one of the remote sites to the main site. The DWDM signal may be received from at least one of the remote sites on a different wavelength to that of the DWDM signal received from the main site. According to examples of the present disclosure, bidirectional transmission of DWDM signals between main and remote sites may thus be unaffected by the routing of OSC signals according to aspects and examples of the present disclosure.

According to another aspect of the present disclosure, there is provided a method for performing Optical Supervisory Channel (OSC) communications in an optical network, the optical network comprising a main site and a plurality of remote sites, wherein the main and remote sites are comprised within a Radio Access Network and wherein the main and remote sites are connected via a point to multipoint optical infrastructure. The method, performed in a remote site of the optical network, comprises receiving an OSC signal on an OSC on one of a first wavelength or a second wavelength, and returning an OSC signal on the OSC on the other of the first wavelength or the second wavelength, the OSC being transported over the point to multipoint optical infrastructure.

According to examples of the present disclosure, the optical network may comprise a hub node and the point to multipoint optical infrastructure may comprise a bidirectional single fiber connection between the main site and the hub node and bidirectional single fiber connections between the hub node and the remote sites. Receiving an OSC signal on an OSC on one of a first wavelength or a second wavelength may comprise receiving the OSC signal via the hub node over the single fiber connection between the hub node and the remote site. Returning an OSC signal on the OSC on the other of the first wavelength or the second wavelength may comprise returning the OSC signal via the hub node over the single fiber connection between the hub node and the remote site.

According to examples of the present disclosure, the main site may comprise a Radio Equipment Control (REC) site and wherein the remote sites comprise Radio Equipment (RE) sites.

According to another aspect of the present disclosure, there is provided a computer program comprising instructions which, when executed on at least one processor, cause the at least one processor to carry out a method according to any one of the preceding aspects of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided a hub node for an optical network, the optical network comprising a main site and a plurality of remote sites, wherein the main and remote sites are comprised within a Radio Access Network and wherein the main and remote sites are connected via a point to multipoint optical infrastructure. The hub node comprises an Optical Supervisory Channel (OSC) routing element configured to receive an OSC signal on an OSC from the main site, to sequentially route OSC signals on the OSC to each of the remote sites in a daisy chain configuration, and to return an OSC signal received on the OSC from a last of the remote sites in the daisy chain configuration to the main site. The OSC routing element is configured to receive, route and return OSC signals on the OSC over the point to multipoint optical infrastructure.

According to examples of the present disclosure, the OSC routing element may comprise a passive optical element.

According to examples of the present disclosure, the OSC routing element may comprise a plurality of Optical Add/Drop, OAD, filters.

According to examples of the present disclosure, the optical network may comprise N remote sites connected to the hub node, and the OSC element may comprise at least N single channel OAD filters and at least N−2 band separation OAD filters.

According to examples of the present disclosure, each single channel OAD filter may be configured to filter out an OSC signal received on the OSC and to forward the received OSC signal on the OSC toward the next remote unit in the daisy chain configuration.

According to examples of the present disclosure, each band separation filter may be configured to add an OSC signal received on the OSC from an nth remote site to a Dense Wavelength Division Multiplexing (DWDM) signal received from the main site for forwarding to the n+1th remote site in the daisy chain configuration, the DWDM signal being transported over the point to multipoint optical infrastructure.

According to examples of the present disclosure, the main site may comprise a Radio Equipment Control (REC) site and the remote sites may comprise Radio Equipment (RE) sites.

According to examples of the present disclosure, the hub node may further comprise a splitter element configured to receive a DWDM signal from the main site and to forward at least a part of the DWDM signal to the remote sites.

According to examples of the present disclosure, the OSC routing element may be further configured to add the OSC signal received on the OSC from the last of the remote sites in the daisy chain configuration to a DWDM signal to be returned to the main site via the splitter element.

According to examples of the present disclosure, the splitter element may comprise at least one of a broadband coupler or a selective filter.

According to examples of the present disclosure, the splitter element may comprise a selective filter, and the OSC routing element may comprises a pair of OAD filters configured to separate the OSC signal received on the OSC from the main site from a DWDM signal received from the main site and to add the OSC signal received on the OSC from the last of the remote sites in the daisy chain configuration to a DWDM signal for sending to the main site.

According to another aspect of the present disclosure, there is provided a hub node for an optical network, the optical network comprising a main site and a plurality of remote sites, wherein the main and remote sites are comprised within a Radio Access Network and wherein the main and remote sites are connected via a point to multipoint optical infrastructure. The hub node is adapted to receive an Optical Supervisory Channel (OSC) signal on an OSC from the main site, sequentially route OSC signals on the OSC to each of the remote sites in a daisy chain configuration, and return an OSC signal received on the OSC from a last of the remote sites in the daisy chain configuration to the main site. The OSC is transported over the point to multipoint optical infrastructure.

According to another aspect of the present disclosure, there is provided a hub node for an optical network, the optical network comprising a main site and a plurality of remote sites, wherein the main and remote sites are comprised within a Radio Access Network and wherein the main and remote sites are connected via a point to multipoint optical infrastructure. The hub node comprises a processor and a memory, the memory containing instructions executable by the processor such that the hub node is operable to receive an Optical Supervisory Channel (OSC) signal on an OSC from the main site, sequentially route OSC signals on the OSC to each of the remote sites in a daisy chain configuration, and return an OSC signal received on the OSC from a last of the remote sites in the daisy chain configuration to the main site, the OSC being transported over the point to multipoint optical infrastructure.

According to another aspect of the present disclosure, there is provided a remote site node for an optical network, the optical network comprising a main site and a plurality of remote sites, wherein the main and remote sites are comprised within a Radio Access Network and wherein the main and remote sites are connected via a point to multipoint optical infrastructure. The remote site node comprises an Optical Supervisory Channel (OSC) element configured to receive an OSC signal on an OSC on one of a first wavelength or a second wavelength, and to return an OSC signal on the OSC on the other of the first wavelength or the second wavelength. The OSC element is configured to receive and return OSC signals on the OSC over the point to multipoint optical infrastructure.

According to examples of the present disclosure, the optical network may comprise a hub node and the point to multipoint optical infrastructure may comprise a bidirectional single fiber connection between the main site and the hub node and bidirectional single fiber connections between the hub node and each of the remote sites. The OSC element may be configured to receive the OSC signal via the hub node over the dedicated single fiber connection between the hub node and the remote site, and to return the OSC signal via the hub node over the dedicated single fiber connection between the hub node and the remote site.

According to examples of the present disclosure, the main site may comprise a Radio Equipment Control (REC) site and the remote sites may comprise Radio Equipment (RE) sites.

According to examples of the present disclosure, the OSC element may comprise an OSC Optical Add/Drop (OAD) filter and an OSC transceiver.

According to examples of the present disclosure, the OSC OAD filter may be configured to drop OSC signals and the OSC transceiver may be configured to receive OSC signals on one of a first wavelength or a second wavelength, and the OSC OAD filter may be configured to add OSC signals and the OSC transceiver may be configured to transmit OSC signals on the other of the first wavelength or the second wavelength.

According to another aspect of the present disclosure, there is provided a remote site node for an optical network, the optical network comprising a main site and a plurality of remote sites, wherein the main and remote sites are comprised within a Radio Access Network and wherein the main and remote sites are connected via a point to multipoint optical infrastructure. The remote site node is adapted to receive an OSC signal on an OSC on one of a first wavelength or a second wavelength and return an OSC signal on the OSC on the other of the first wavelength or the second wavelength, the OSC being transported over the point to multipoint optical infrastructure.

According to another aspect of the present disclosure, there is provided a remote site node for an optical network, the optical network comprising a main site and a plurality of remote sites, wherein the main and remote sites are comprised within a Radio Access Network and wherein the main and remote sites are connected via a point to multipoint optical infrastructure. The remote site node comprises a processor and a memory, the memory containing instructions executable by the processor such that the remote site node is operable to receive an OSC signal on an OSC on one of a first wavelength or a second wavelength and return an OSC signal on the OSC on the other of the first wavelength or the second wavelength, the OSC being transported over the point to multipoint optical infrastructure.

According to another aspect of the present disclosure, there is provided a system for communications in an optical network, the system comprising a main site, a hub node and a plurality of remote sites, wherein the main and remote sites are comprised within a Radio Access Network and wherein the main and remote sites are connected via a point to multipoint optical infrastructure. The main site is configured to send an Optical Supervisory Channel (OSC) signal on an OSC via the hub node. The hub node is configured to receive the OSC signal on the OSC from the main site, to sequentially route OSC signals on the OSC to each of the remote sites in a daisy chain configuration, and to return an OSC signal received on the OSC from a last of the remote sites in the daisy chain configuration to the main site. The remote sites are configured to receive OSC signals on the OSC via the hub node and to return OSC signals on the OSC via the hub node, the OSC being transported over the point to multipoint architecture.

According to examples of the present disclosure, the hub node may be configured to receive the OSC signal on the OSC from the main site on a first wavelength and to forward an OSC signal received on the OSC from an nth remote site to an n+1th remote site in the daisy chain configuration on the same wavelength on which the OSC signal was received from the nth remote site, the wavelength being one of the first wavelength or a second wavelength.

According to examples of the present disclosure, the hub node may be configured to return an OSC signal received on the OSC from a last of the remote sites in the daisy chain configuration to the main site on a third wavelength.

According to examples of the present disclosure, each remote site may be configured to receive an OSC signal on the OSC via the hub node on one of the first wavelength or the second wavelength and to return an OSC signal via the hub node on the OSC on the other of the first wavelength or the second wavelength.

According to examples of the present disclosure, each of the main site and the plurality of remote sites may comprise a single OSC transceiver and at least one OSC Optical Add/Drop (OAD) filter.

According to examples of the present disclosure, the main site OSC OAD filter may be configured to filter a first wavelength and a third wavelength, one of the remote site OSC OAD filters may be configured to filter a second wavelength and the third wavelength, and the remaining remote site OSC OAD filters may be configured to filter the first wavelength and the second wavelength.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Aspects of the present disclosure provide a method for facilitating OSC communications in a fronthaul tree topology according to which OSC signals are passed along a daisy chain of unidirectional connections from one remote site to the next. Additional details of methods and nodes according to the present disclosure are discussed with reference to FIGS. 3 to 10, together with certain advantages they may afford. For the purposes of illustration and comparison, FIG. 2 illustrates one way in which OSC communications may be established between main and remotes sites of a fronthaul tree topology according to a conventional approach, involving dedicated OSC transceivers at each endpoint of an OSC, with a dedicated bidirectional OSC for each remote site in the topology.

Figure 1:
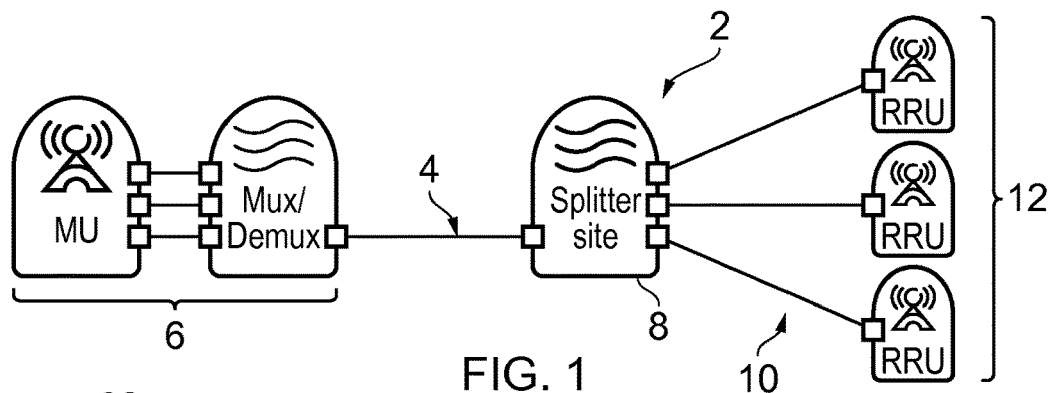
FIG. 1 illustrates a fronthaul tree topology.
Figure 2:
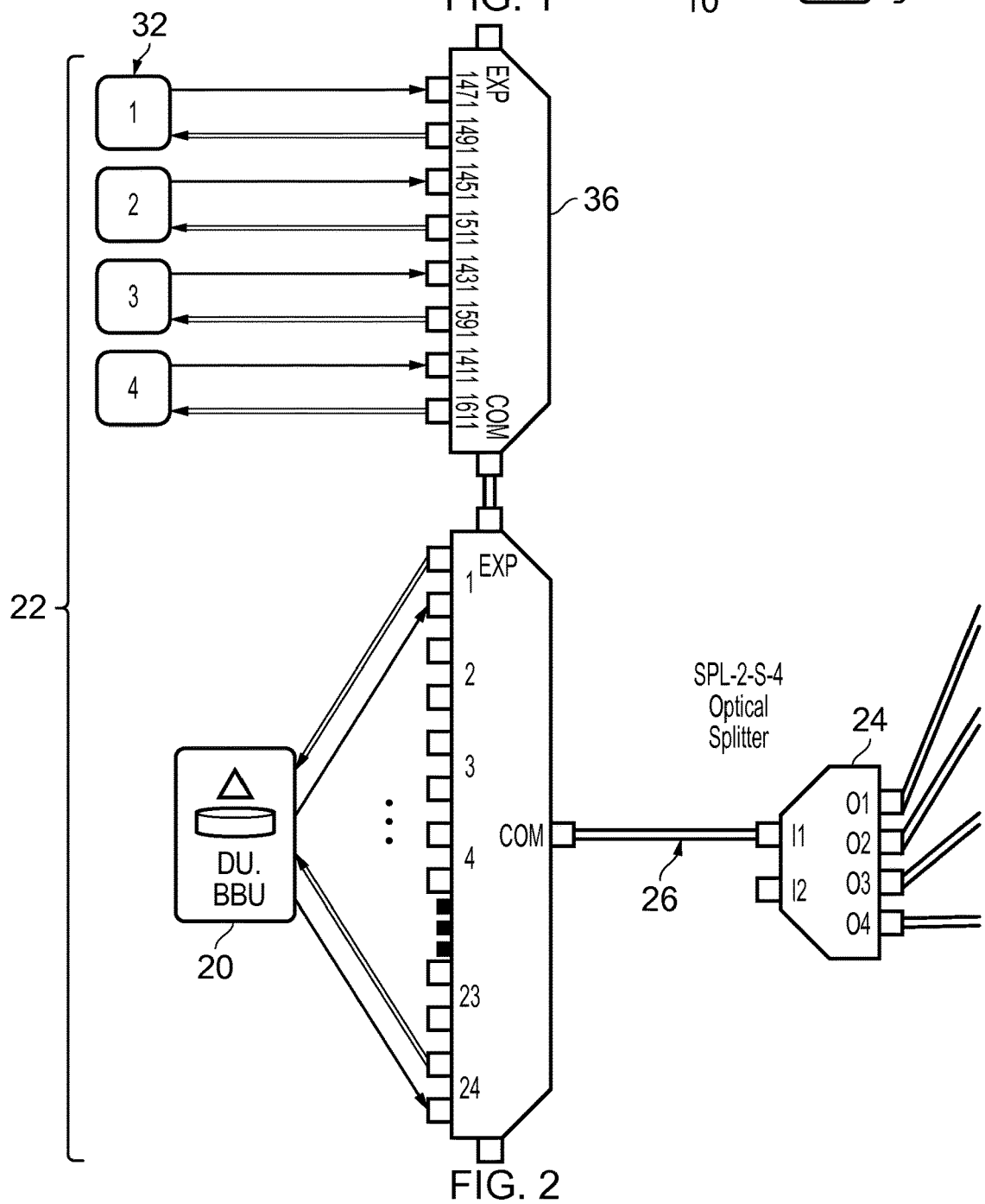
FIG. 2 illustrates a fronthaul deployment with parallel bidirectional OSC connections between main and remote sites.
Figure 2:
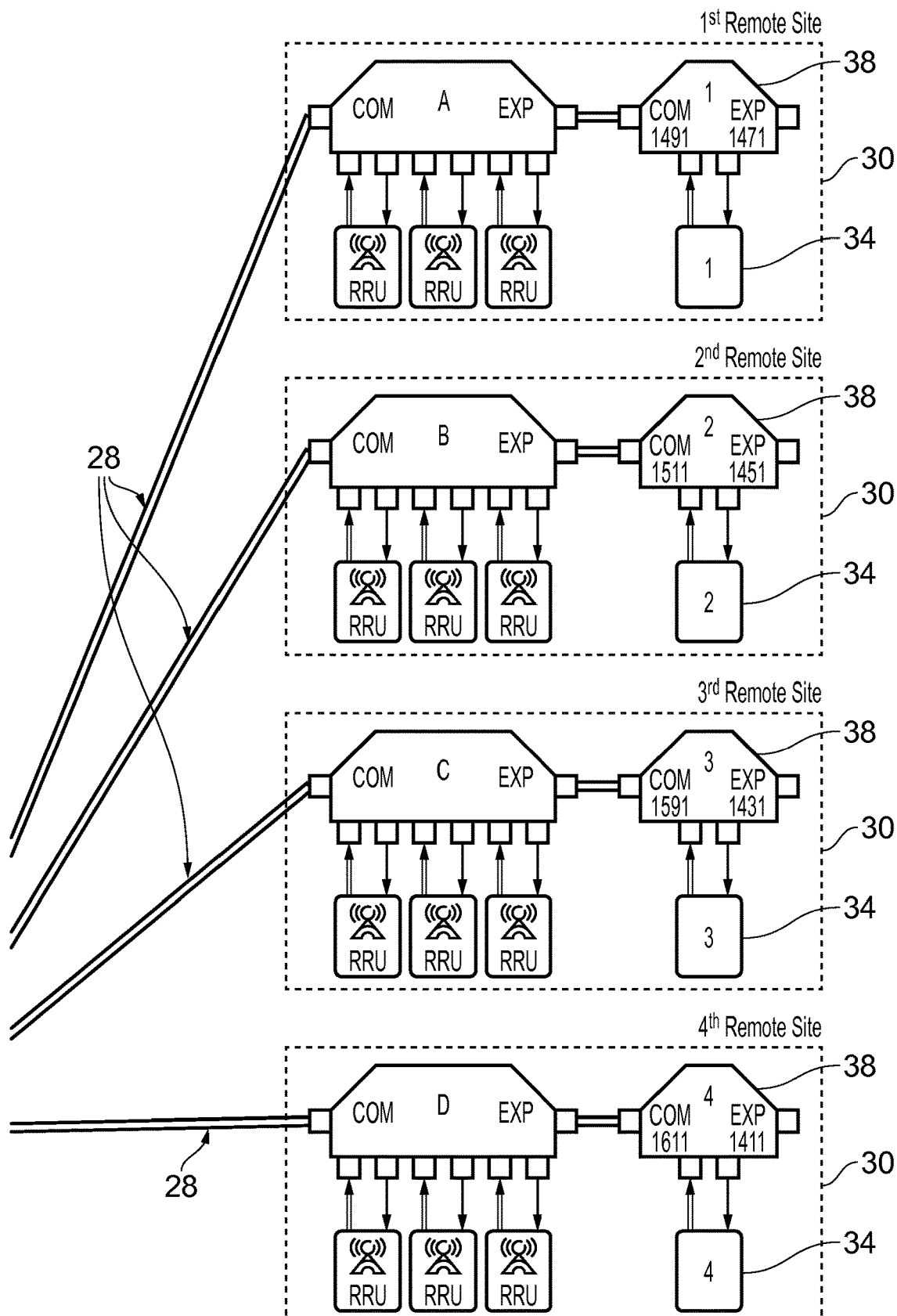

Referring to FIG. 2, in the illustrated example fronthaul segment, a REC 20 located at a main site 22 is connected to an optical splitter 24 via a single fiber connection 26. The optical splitter 24 has single fiber connections 28 to each of four RE sites 30. Four parallel bidirectional OSCs are established with one OSC transceiver 32 at the main site and one OSC transceiver 34 at the remote site for each channel. As all the OSC communications are carried over the single fiber connection between the optical splitter 24 and the main site 22, each transceiver pair uses two different dedicated wavelengths, one for the upstream direction and one for the downstream direction. In the example of FIG. 2, the OSC wavelengths are CWDM wavelengths, with a multi-channel CWDM Mux/demux filter 36 located at the main site 22 and a dedicated filter 38 at each remote site adding/dropping the OSC frequencies for the remote site.

In the deployment illustrated in FIG. 2, for an N branch tree topology, 2N OSC transceivers are required and an additional 2N wavelengths for the OSC traffic. This implies significant additional cost and complexity above that required for the CPRI signalling. In addition, the deployment is not conducive to scaling with the addition of new remote sites, as each new remote site requires a new transceiver at the main site and appropriate filters in the main site Mux/demux 36.

According to examples of the present disclosure, OSC communications may be facilitated in a fronthaul tree topology using considerably fewer transceivers and dedicated wavelengths than in the arrangement of FIG. 2, and without the need for a multi-channel Mux/demux filter at the main site. This may be achieved by replacing the N parallel bi-directional OSC connections between the main site and the remote sites with a daisy chain of N+1 connections. In this manner, only a single OSC transceiver is required at the main site in addition to a single OSC transceiver at each of the remote sites. With only a single OSC transceiver at the main site, there is no need for the multi-channel Mux/demux, and the overall number of transceivers required is reduced from 2N in the arrangement of FIGS. 2 to N+1. In addition, the number of wavelengths required for OSC communications is reduced from 2N to just three, regardless of the number N of branches in the tree topology. This significant reduction in the number of wavelengths required for OSC communications may be achieved by alternating the same two wavelengths in the remote site-to-remote site communications that form the links of the daisy chain. The third wavelength may be used by the final remote site in the daisy chain to return an OSC signal to the main site.

Figure 3:
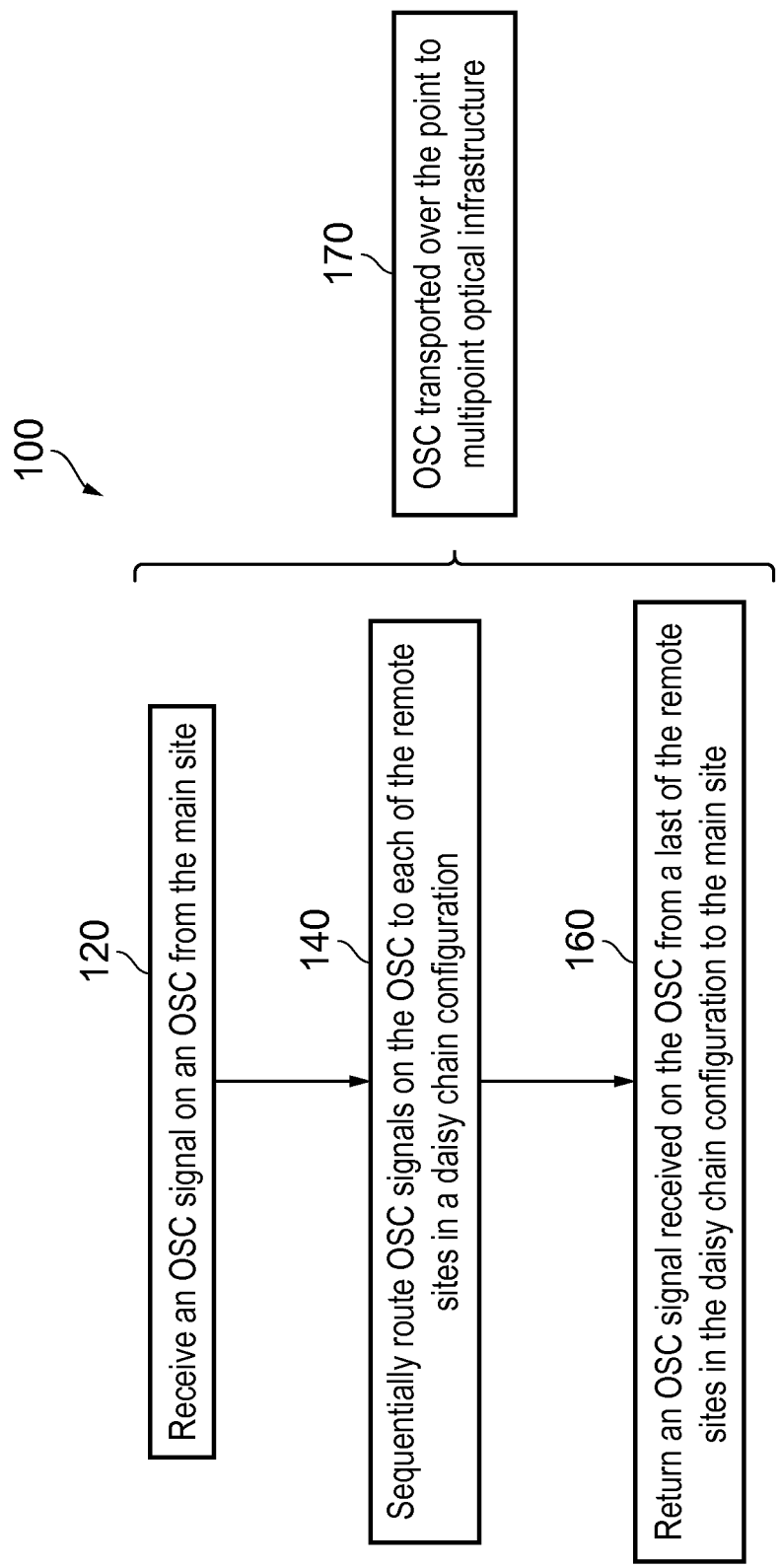
FIG. 3 is a flow chart illustrating process steps in a method for facilitating OSC communications.

FIG. 3 illustrates process steps in a method 100 according to an example of the present disclosure. The method of FIG. 3 is for facilitating OSC communications between a main site and a plurality of remote sites in an optical network. The main and remotes sites of the optical network are comprised within a Radio Access Network. In some aspects, the network may constitute a segment of a fronthaul network. The main site may comprise a REC site and the remote sites may comprise RE sites. The main site or REC may provide baseband processing, e.g. using one or more Digital Units or Baseband Units, for the remote radio units at the plurality of RE sites. The main and remote sites are connected via a point to multipoint optical infrastructure. Referring to FIG. 3, in a first step 120, the method comprises receiving an OSC signal on an OSC from the main site. The method then comprises, in step 140, sequentially routing OSC signals on the OSC to each of the remote sites in a daisy chain configuration, and, in step 160, returning an OSC signal received on the OSC from a last of the remote sites in the daisy chain configuration to the main site. As shown in step 170, the OSC is transported over the point to multipoint optical infrastructure which connects the main and remote sites. In some examples, OSC signals transported on the OSC may be modified, for example with the addition of new data, at one or more of the remote sites before the signals are transported to the next remote site in the daisy chain.

Figure 10:
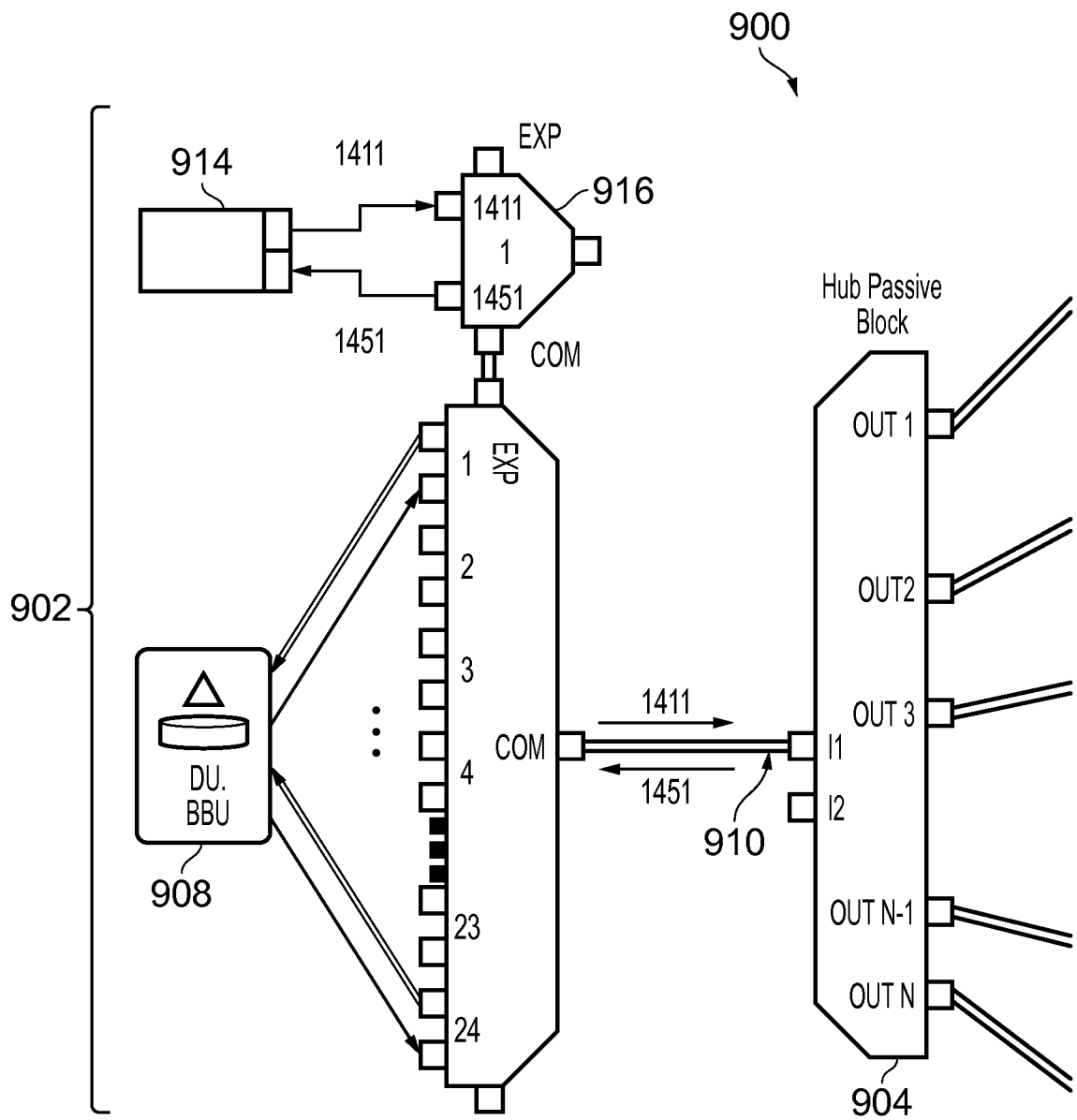
FIG. 10 illustrates a fronthaul deployment according to an example of the present disclosure.
Figure 10:
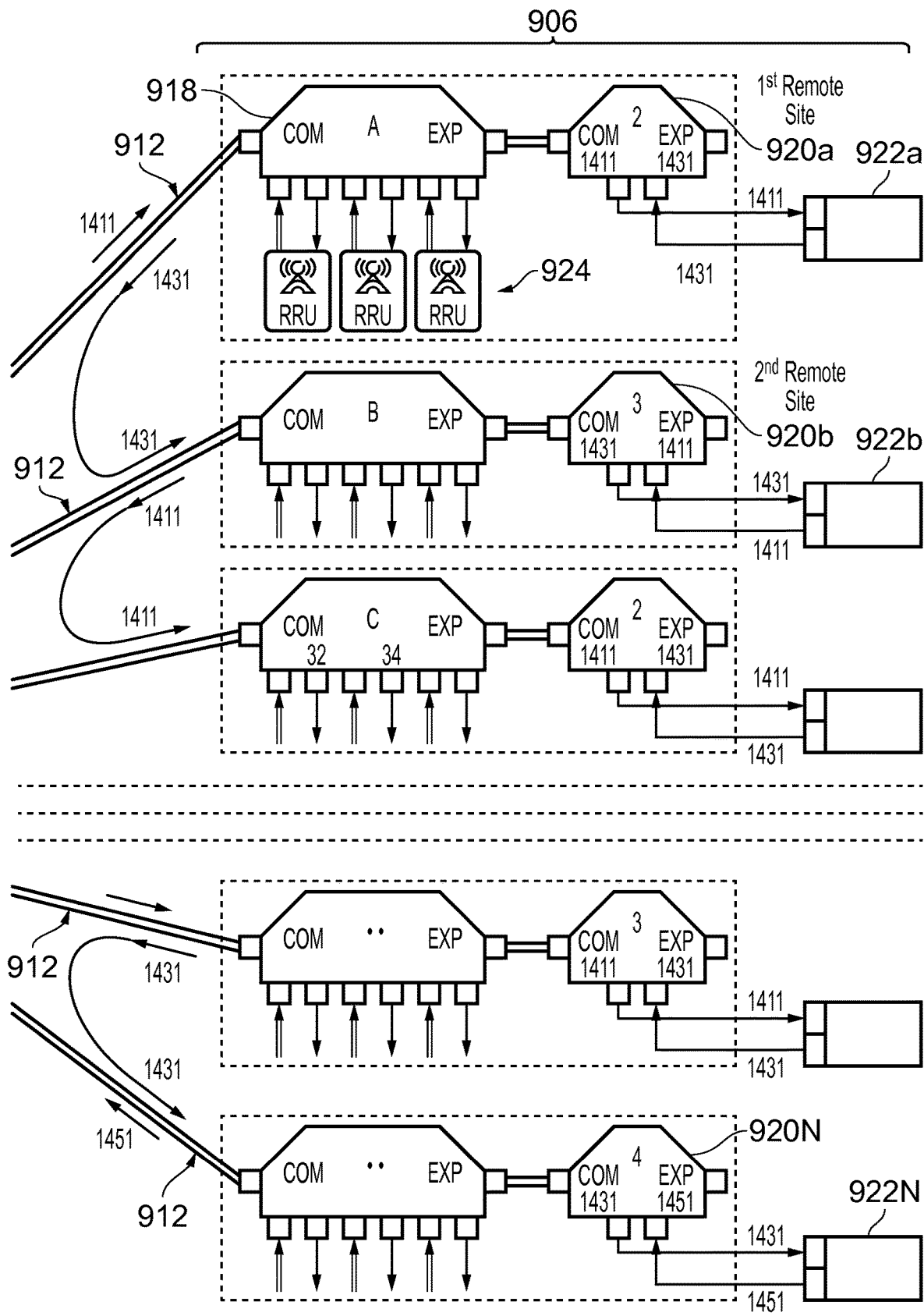

The method 100 may in some examples be performed by a hub node comprised within the optical network, such as hub node 904 illustrated in FIG. 10. The point to multipoint optical infrastructure may comprise a bidirectional single fiber connection between the main site and the hub node. The optical infrastructure may comprise bidirectional single fiber connections between the hub node and each of the remote sites.

Figure 4:
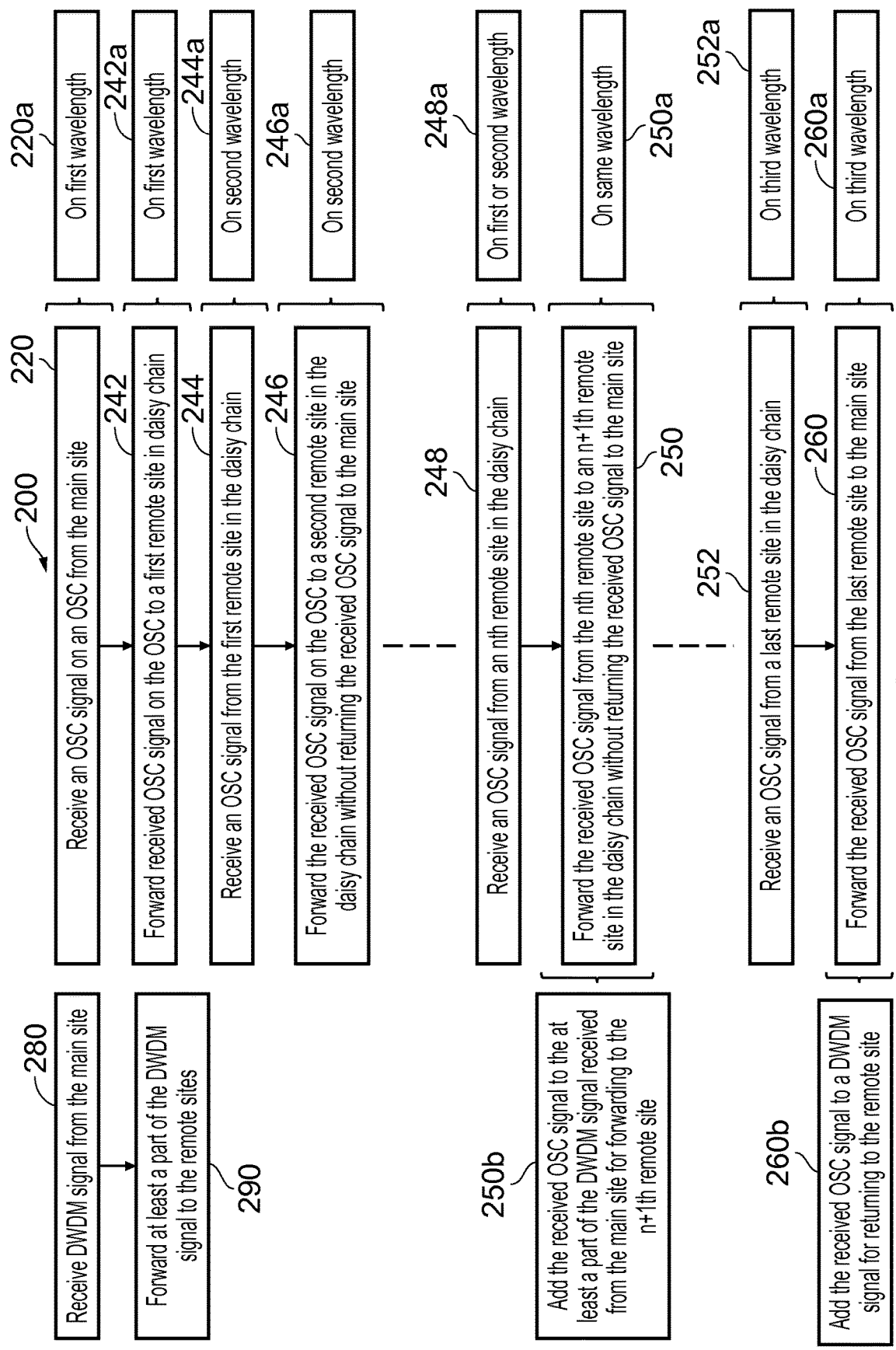
FIG. 4 is a flow chart illustrating process steps in another example of method for facilitating OSC communications.

FIG. 4 illustrates process steps in another example of method 200 for facilitating OSC communications in an optical network. The method 200 illustrates one way in which the steps of the method 100 may be implemented and supplemented to achieve the above discussed and additional functionality. As for the method 100 of FIG. 3, the method 200 of FIG. 4 is for facilitating OSC communications between a main site and a plurality of remote sites in an optical network. The main and remotes sites of the optical network are comprised within a Radio Access Network; the main site may comprise a REC site and the remote sites may comprise RE sites. The main and remote sites are connected via a point to multipoint optical infrastructure. In the illustrated example, the method 200 may be performed by a hub node comprised within the optical network. The point to multipoint optical infrastructure may comprise a bidirectional single fiber connection between the main site and the hub node and bidirectional single fiber connections between the hub node and each of the remote sites.

Referring to FIG. 4, in a first step 220, the hub node receives an OSC signal on an OSC from the main site. The OSC signal is received on a first wavelength as shown at 220a. The hub node then forwards the received OSC signal on the OSC to a first remote site in a daisy chain configuration in step 242. The hub node forwards the received OSC signal on the first wavelength as shown at 242a. The hub node then receives an OSC signal from the first remote site in the daisy chain in step 244. The OSC signal is received by the hub node on a second wavelength, as shown at 244a. The second wavelength may be different from the first wavelength. The hub node forwards the OSC signal received from the first remote site to a second remote site in the daisy chain on the OSC at step 246. This forwarding is conducted without returning the received OSC signal from the first remote site to the main site. As such, the OSC signal for the second remote site is not transmitted directly from the main site (i.e. baseband processing unit site). The OSC signal for the second remote site is transmitted only via one or more other remote site. The hub node, which is remote from the main site, provides for transmitting the OSC signal between the remote sites, prior to returning to the main site. As shown at step 246a, the hub node forwards the received OSC signal to the second remote site in the daisy chain on the same second wavelength on which it was received from the first remote site in the daisy chain. The hub node repeats the steps of receiving and forwarding OSC signals along the daisy chain configuration, as illustrated in steps 248 and 250. In step 248, the hub node receives an OSC signal from an nth remote site in the daisy chain on one of the first or second wavelengths, as shown at step 248a. In step 250, the hub node forwards the OSC signal received from the nth remote site to an n+1th remote site in the daisy chain without returning the received OSC signal to the main site. The OSC signal for the n+1th remote site is thus not transmitted directly from the main site but is transmitted only via one or more other remote sites through the action of the hub node. As shown in 250a, the hub node forwards the received OSC signal to the n+1th site on the same wavelength on which it was received from the nth remote site. In this manner, the same first and second wavelengths may be alternated in each remote site-to-remote site link of the daisy chain.

In step 252, the hub node receives an OSC signal from a last remote site in the daisy chain. As shown in 252a, the OSC signal is received on a third wavelength, which may be different from the first and second wavelengths. The hub node then forwards the OSC signal received from the last remote site to the main site in step 260. As illustrated in 260a, the hub node forwards the OSC signal to the main site on the third wavelength. In each of the steps 220 to 260, the OSC signals are received and forwarded by the hub node over the point to multipoint optical infrastructure; that is over the single fiber connections between the hub node and the main site and between the hub node and each remote site. The hub node may also receive a DWDM signal from the main site, as illustrated in step 280. The DWDM signal may also be received over the point to multipoint optical infrastructure; that is over the bidirectional single fiber connection between the hub node and the main site. The hub node may then forward at least a part of the DWDM signal to the remote sites over the single fiber connections between the hub node and the remote sites in step 290. As illustrated in step 250b, when forwarding an OSC signal to an n+1th remote site, the hub node may add the received OSC signal from the nth site to the at least a part of the DWDM signal which is for forwarding to the n+1th remote site. As illustrated at step 260b, when forwarding the received OSC signal from the last remote site to the main site, the hub node may add the received OSC signal to a DWDM signal for returning to the main site. The DWDM signal may be a CPRI signal or may be a fronthaul signal conforming to other fronthaul interface standards. Bidirectional DWDM fronthaul signalling between main and remote sites may thus be unaffected by the routing of OSC signals along the daisy chain configuration by the hub node.

As discussed above, the first, second and third wavelengths on which the OSC signals are transmitted between the main site and hub, and along the daisy chain configuration of remote sites, may each be different. In one example the first, second and third wavelengths may be the 1411 nm, 1431 nm and 1451 nm CWDM wavelengths. Other CWDM or DWDM wavelengths may be envisaged for the OSC signals according to other examples. It will be appreciated that despite using only three wavelengths for OSC signals, the actions of the hub node and remote sites to alternate wavelengths in each connection of the daisy chain ensure that in each single fiber connection of the optical infrastructure two different wavelengths are used, one in the upstream and one in the downstream direction, to avoid Raleigh scattering. This is the case regardless of the number of remote sites, and hence the number of connections in the daisy chain.

Figure 5:
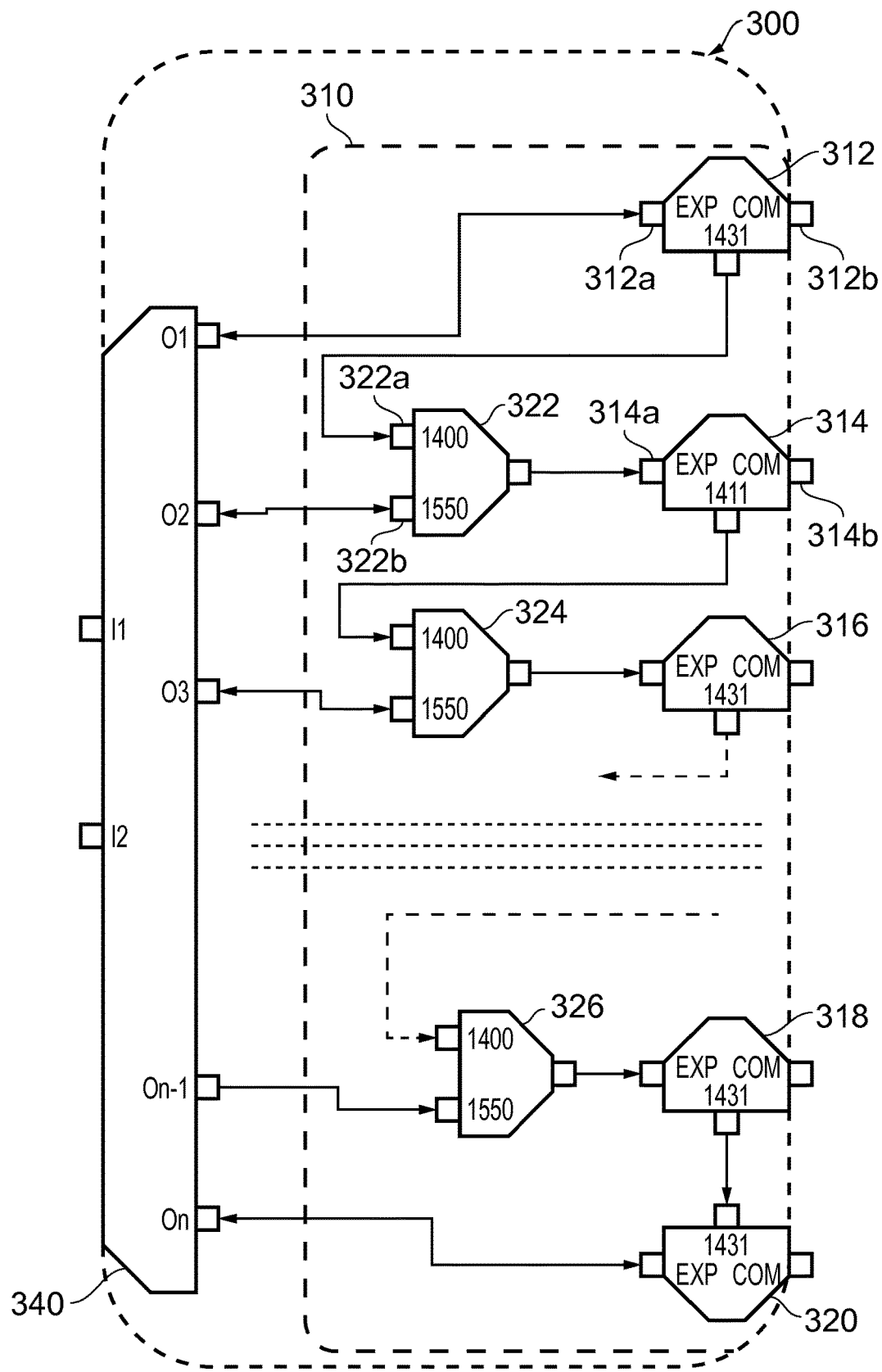
FIG. 5 is a block diagram representing a hub node.
Figure 6:
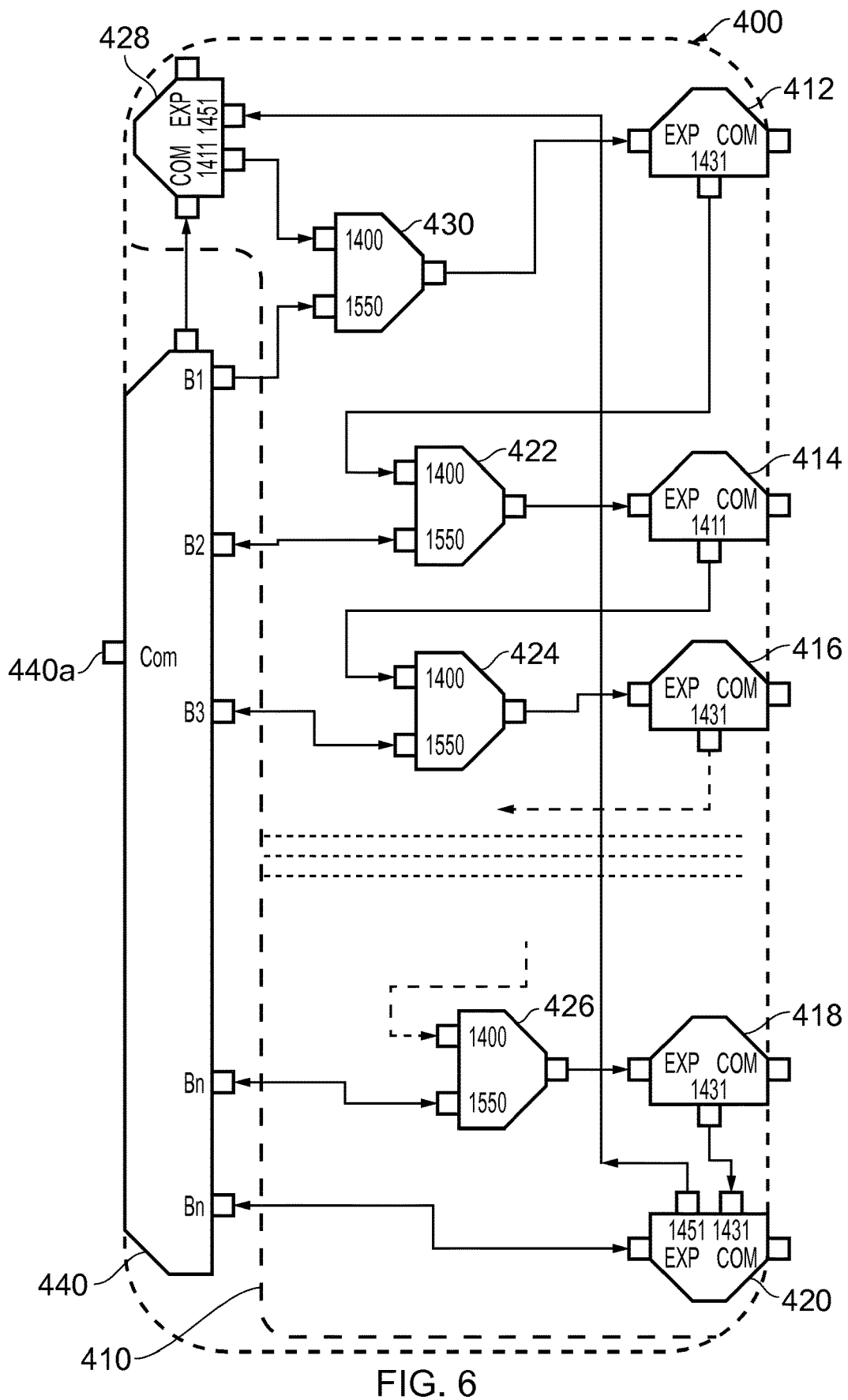
FIG. 6 is a block diagram illustrating another example of hub node.

The methods 100, 200 may be performed in a hub node, which may be a passive optical element which implements the daisy chain routing of OSC signals. A hub node according to examples of the present disclosure may comprise an OSC routing element configured to receive an OSC signal on an OSC from a main site, to route OSC signals over a daisy chain configuration of remote sites, and to return OSC signals on the OSC to the main site, all over a point to multipoint optical infrastructure that connects the main and remote sites via the hub node. The OSC routing element may comprise a plurality of optical Add/Drop (OAD) filters. For N remote sites in the optical network, the OAD filters may comprise at least N single channel OAD filters and at least N−2 band separation filters, as discussed in greater detail below. The hub node may also comprise a splitter element configured to receive a DWDM signal from the main site and to forward at least a part of the DWDM signal to the remote sites. It will be appreciated that the OSC routing element of the hub node performs routing of OSC signals to form a daisy chain while leaving unaltered the DWDM traffic being forwarded to the remote sites. FIGS. 5 and 6 illustrate two different examples of hub node. FIG. 5 illustrates a hub node having a broadband splitter element, and FIG. 6 illustrates a hub node having a selective splitter element.

Referring to FIG. 5, the example hub node 300 comprises a broadband splitter 340 and an OSC routing element 310. As discussed above, for N remote sites, the OSC routing element comprises N single channel OAD filters 312, 314, 316, 318, 320 etc, and N−2 band separation OAD filters 322, 324, 326 etc. Each single channel filter is arranged to filter out an OSC signal received on the OSC from a remote site and to forward the OSC signal, via a band separation filter, toward the next remote site. Each band separation filter is configured to add an OSC signal received from an nth remote site to a DWDM signal received from the main site for forwarding to an n+1th remote site.

The hub node 300 may be deployed such that a single fiber connection to a main site arrives at port 11 of the broadband optical splitter 340. Carried on the single fiber connection to 11 are a (D)WDM signal and an OSC signal, the OSC signal being transported on the first wavelength, which according to the example of FIG. 5 is 1411 nm. The broadband optical splitter splits the signals received on the port 11 and forwards them to ports O1 to On. The signal transmitted on port O1 is passed to the EXP port 312a of the first single channel OAD filter 312, which forwards the signal, including DWDM signal and OSC signal, to the first remote site via its COM port 312b. The first remote site returns both a DWDM signal and an OSC signal via the hub node 300. The OSC signal is on the second wavelength 1431 nm. This wavelength is filtered out by OAD filter 312 and passed to the first band separation filter 322. The DWDM signal is unaffected by this filtering and is passed back to the broadband splitter 340 for returning to the main site. The first band separation filter 322 receives the filtered OSC signal from the single channel filter 312 on a port 322a which accepts signals in the 1400 nm range. Port 322b on the first band separation filter 322 receives the split signal from the optical splitter 40 and allows only the DWDM wavelength 1550 nm to pass, excluding the OSC signal from the main site on the first wavelength 1411 nm. The band separation filter 322 thus combines the DWDM signal from the main site with the OSC signal from the first remote site, on the second wavelength 1431, and forwards this combined signal to the second remote site via the second signal channel OAD filter 314. The second signal channel filter 314 receives the combined signal on its EXP port 314a and forwards it to the second remote site via its COM port 314b. The second signal channel filter 314 receives a signal from the second remote site comprising an OSC signal on the first wavelength, 1411 nm, and a DWDM signal. The second single channel filter 314 filters out the OSC signal and passes this to the second band separation filter 324, while passing the DWDM signal back to the optical splitter 340.

The OSC routing element 310 continues to implement the daisy chain routing of OSC signals via the single channel and band separation filters, at each stage separating an OSC signal received from an nth remote site for forwarding to an n+1th remote site, while continuing to forward DWDM signals between the man and remote sites. The final single channel filter 320 receives an OSC signal from the final remote site in the daisy chain on a third wavelength 1451 nm and forwards this signal, together with a DWDM signal received from the final remote site, back to the optical splitter 340 for returning to the main site.

It will be appreciated that the N single channel filters and N−2 band separation filters that form the OSC routing element 310 are relatively cheap components and do not therefore represent a significant additional investment to provision the hub node. The cost of these filters would be roughly equivalent to the cost of the 2N filters required in the multi-channel CWDM Mux/demux filter 36 located at the main site 22 of the conventional approach deployment illustrated in FIG. 2. The hub element of FIG. 5 thus does not introduce any additional complexity in terms of passive optical components when compared with the deployment of FIG. 2, but allows for a dramatic reduction in the number of OSC wavelengths, the number of filter variants required at the main and remote sites and in the number of OSC transceivers, as discussed in further detail with reference to FIG. 10.

FIG. 6 illustrates another example of hub node 400 in which the optical splitter comprises a selective splitter. As in example hub node 300, hub node 400 comprises an OSC routing element 410 and optical splitter 440. The OSC routing element 410 comprises N single channel OAD filters 412, 414, 416, 418, 420 etc., and N−2 band separation OAD filters 422, 424, 426 etc. Each of the N single channel filters is arranged to filter out an OSC signal received on the OSC from a remote site and to forward the OSC signal, via a band separation filter, toward the next remote site. Each band separation filter is configured to add an OSC signal received from an nth remote site to a DWDM signal received from the main site for forwarding to an n+1th remote site. In this example node 400, the selective splitter 440 receives a DWDM signal and an OSC signal via its COM port 440a and passes individual DWDM signals to each of its ports B1 to Bn. The nature of the selective splitter 440 means that if CWDM wavelengths are used for OSC signals, as in the illustrated example, these wavelengths will not pass though the output ports B of the splitter 440. The OSC routing element 410 thus comprises an additional pair of filters 428 and 430 which are arranged to couple the two OSC wavelengths used toward the main site (the first and third wavelengths, 1411 nm and 1451 nm in the present example). OAD filter 428 receives both OSC and DWDM signals received from the main site, separates the OSC signal received on the OSC channel from the main site (on the first wavelength 1411 nm) and forwards the OSC signal to filter 430, where the OSC signal is recombined with the DWDM signal for forwarding to the first remote site. OAD filter 428 also receives a filtered OSC signal received from the last remote site on the third wavelength 1451 nm via the last single channel filter 420, and forwards this OSC signal to the optical splitter 440 for returning to the main site together with DWDM signals from the remote sites.

In will be appreciated that in the event that OSC signals are transmitted on DWDM wavelengths, the additional filters 428 and 430 may be dispensed with, as the OSC DWDM wavelengths may be integrated with other DWDM wavelengths in the selective optical splitter 440. However, in order to save DWDM channels for fronthaul traffic (for example CPRI traffic), it is envisaged that the use of CWDM channels for OSC signals may be preferred in some deployments. It is also envisaged that a hub node including a selective splitter, as illustrated in FIG. 6, may be preferred in a deployment topology comprising a high number N of remote sites, owing to the lower insertion loss exhibited by selective filters when compared with broadband splitters.

Figure 7:
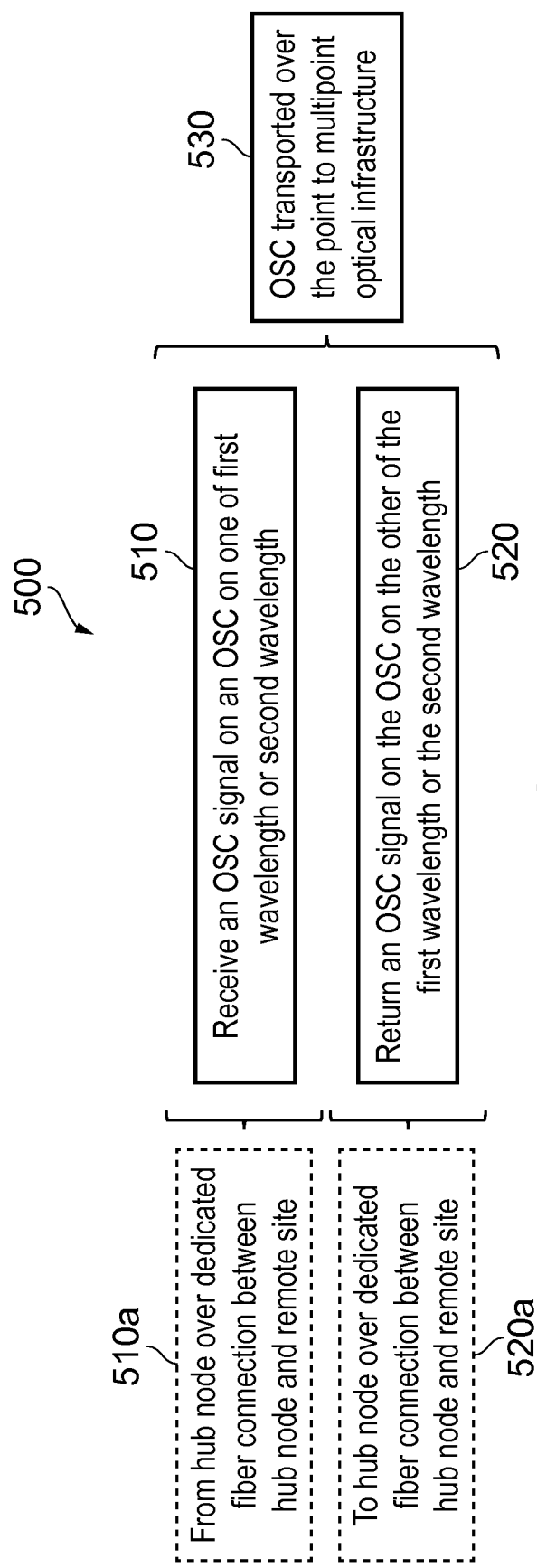
FIG. 7 is a flow chart illustrating process steps in a method for performing OSC communications.

FIG. 7 illustrates process steps in a method 500 which may be conducted at a remote site of an optical network, which may for example be a RE site of a fronthaul deployment. The remote site is connected to a main site, which may be a REC site, via a point to multipoint optical infrastructure. The method 500 may complement the methods 100, 200 which may be conducted in a hub node. Referring to FIG. 7, in a first step 510, the remote site receives an OSC signal on an OSC on one of a first wavelength or a second wavelength. Certain processing may be performed on the OSC signal at the remote site (not shown). In step 520, the remote site returns an OSC signal on the OSC on the other of the first wavelength or the second wavelength. As illustrated at 530, the OSC signals are transported over the point to multipoint optical infrastructure. The optical network may comprise a hub node, and the point to multipoint optical infrastructure may comprise a bidirectional single fiber connection between the main site and the hub node and bidirectional single fiber connections between the hub node and each of the remote sites. As illustrated at 510*a*, the OSC signal may be received via the hub node over a single fiber connection between the hub node and the remote site. As illustrated at 520*a*, the OSC signal may be returned via the hub node over the single fiber connection between the hub node and the remote site.

Figure 8:
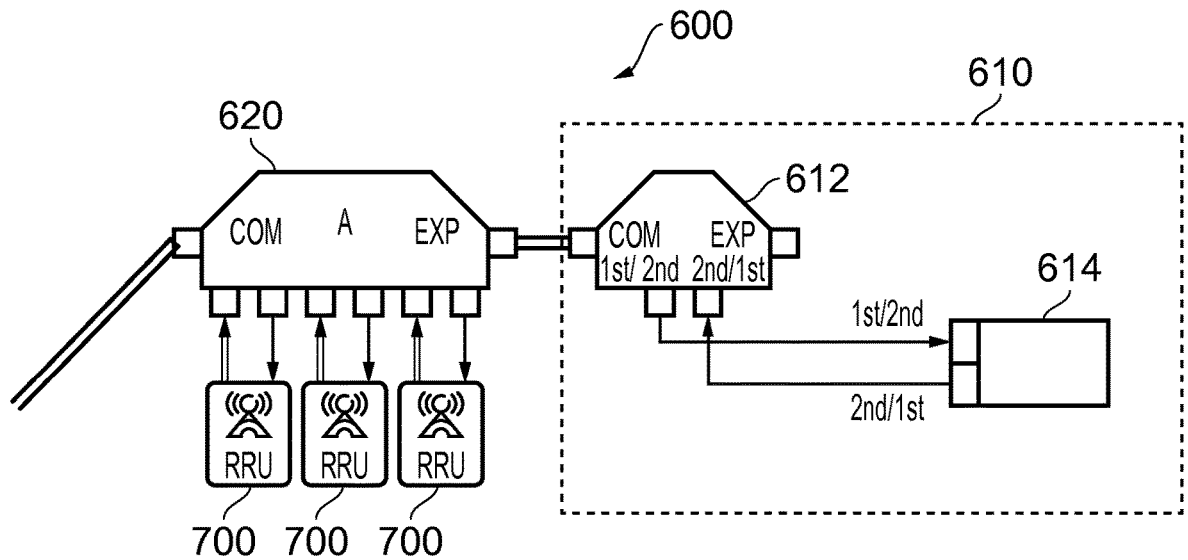
FIG. 8 is a block diagram representing a remote site node.

The method 500 may be conducted in a remote site node, an example of which is illustrated in FIG. 8. The remote site node may be a part of an optical network which comprises a main site and a plurality of remote sites, the main and remote sites being comprised within a Radio Access Network and being connected via a point to multipoint optical infrastructure. The example remote site node 600 of FIG. 8 comprises an OSC element 610, configured to receive an OSC signal on an OSC on one of a first wavelength or a second wavelength, and to return an OSC signal on the OSC on the other of the first wavelength or the second wavelength, the OSC signals being received and returned over the point to multipoint optical infrastructure. The OSC element 610 of example remote site node 600 comprises an OSC OAD filter 612 and an OSC transceiver 614. The OSC OAD filter 612 is configured to drop OSC signals on one of a first wavelength or a second wavelength and to add OSC signals on the other of the first wavelength or the second wavelength. The OSC transceiver 614 is configured to receive OSC signals on the wavelength dropped by the OSC OAD filter 612 and to transmit OSC signals on the wavelength added by the OSC OAD filter 612. The example remote site node 600 also comprises an optical mux/demux 620 configured to route DWDM signals from the main site to the various REs 700 which may be associated with the remote site node 600.

Figure 9:
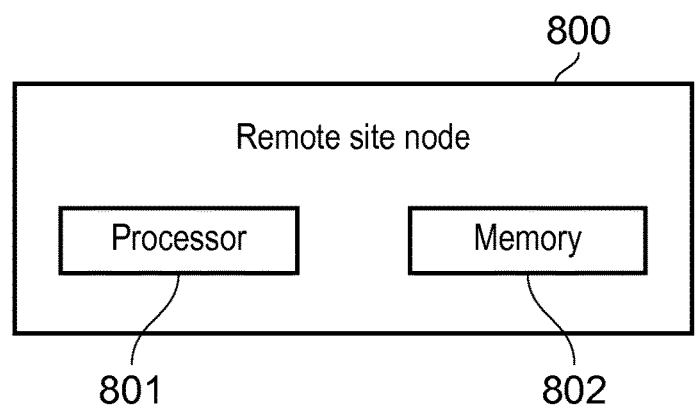
FIG. 9 is a block diagram representing functional units in another example of remote site node.

FIG. 9 illustrates another example of remote site node 800 which may implement the method 500 of FIG. 7, for example on receipt of suitable instructions from a computer program. Referring to FIG. 9, the remote site node 800 comprises a processor 801 and a memory 802. The memory 802 contains instructions executable by the processor 801 such that the remote site node 800 is operative to conduct some or all of the steps of the method 500.

FIG. 10 illustrates a fronthaul segment deployment in accordance with examples of the present disclosure. The deployment comprises a system 900 formed of a main site 902, a hub node 904 and a plurality of remote sites 906, wherein the main and remote sites are comprised within a Radio Access Network and wherein the main and remote sites are connected via a point to multipoint optical infrastructure. In the illustrated example, the point to multipoint optical infrastructure comprises a bidirectional single fiber connection 910 between the main site 902 and the hub node 910 and bidirectional single fiber connections between the hub node 904 and each of the remote sites 906. Located at the main site 902 are a REC 908, an OSC transceiver 914 and an OAD filter 916. The OAD filter 916 adds a first OSC wavelength (1411 nm in the illustrated example) and drops a third OSC wavelength (1451 nm in the illustrated example). An OSC signal on the first wavelength 1411 nm is thus added, via the filter 916 to a DWDM signal originating from the REC 908 and forwarded to the hub node 904 via the single fiber connection 910.

The hub node 904 comprises a hub node 300 or 400 as illustrated in FIGS. 5 and 6. Each remote site 906 comprises a remote site node 600 as illustrated in FIG. 8. Specifically, each remote site 906 comprises an optical mux/demux 918 configured to route DWDM signals from the main site to the various REs 924 which may be associated with the remote site 906. Each remote site 906 also comprises an OSC element formed of an OSC OAD filter 920 and an OSC transceiver 922. In the first remote site 906, the OSC OAD filter 920*a* is configured to drop OSC signals on the first wavelength 1411 nm and to add OSC signals on the second wavelength 1431 nm. The first remote site OSC transceiver 922*a* is configured to receive OSC signals on the first wavelength 1411 nm (the wavelength dropped by the OSC OAD filter 920*a*) and to transmit OSC signals on the second wavelength 1431 nm (the wavelength added by the OSC OAD filter 920*a*). In the second remote site 906, the first and second wavelengths added/dropped by the OSC OAD filter 920*b* and received and transmitted by the OSC transceiver 922*b* are reversed. Thus the second site OSC OAD filter 920*b* is configured to drop OSC signals on the second wavelength 1431 nm and to add OSC signals on the first wavelength 1411 nm. The second remote site OSC transceiver 922*b* is configured to receive OSC signals on the second wavelength 1431 nm and to transmit OSC signals on the first wavelength 1411 nm. Each remote site 906 alternates the wavelengths for transmission and reception of OSC signals until the last remote site N. In the last remote site, the OSC OAD filter 920N is configured to drop OSC signals on the second wavelength 1431 nm and to add OSC signals on the third wavelength 1451 nm. The last remote site OSC transceiver 922N is configured to receive OSC signals on the second wavelength 1431 nm and to transmit OSC signals on the third wavelength 1451 nm.

The flow of OSC signals is illustrated in FIG. 10 with reference to the different wavelengths on which they are transmitted. Thus an OSC signal is initially transmitted from the main site on the first wavelength 1411 nm and is forwarded on that wavelength by the hub node 904 to the first remote site 906. The first remote site 906 returns an OSC signal via the hub node 904 on the second wavelength 1431 nm, and this is forwarded by the hub node on the second wavelength 1431 nm to the second remote site 906. The remote sites alternate first and second wavelengths for each remote site-to remote site transmission via the hub node until the final remote site. The final remote site returns an OSC signal via the hub on the third wavelength 1451 nm and the hub node 904 returns this OSC signal on the third wavelength 1451 nm to the main site 902. It can be seen in FIG. 10 that although only three wavelengths are used for the transmission of OSC signals, in each single fiber connection two different wavelengths are used, one for each transmission direction. As a consequence of the alternating OSC wavelengths, only four different types of OSC OAD filters are required at the main and remote sites. A first type OSC OAD filter is used at the main site, the first type adding the first wavelength 1411 nm and dropping the third wavelength 1451 nm. Alternating second and third types are used at all but the last of the remote sites in the daisy chain, the second type dropping the first wavelength 1411 nm and adding the second wavelength 1431 nm, and the third type dropping the second wavelength 1431 nm and adding the first wavelength 1411 nm. A fourth type OSC OAD filter is used at the final remote site, the fourth type filter dropping the second wavelength 1431 nm and adding the third wavelength 1451 nm. These four types of OAD filters are sufficient to manage the routing of OSC signals, regardless of the number of remote sites, and hence the number of branches in the network topology.

An appreciation of advantages offered by examples of the present disclosure may be gained by comparing the number of OSC wavelengths, the number of OSC transceivers and the number of variants of OSC OAD filter employed in the system 900 of FIG. 10 and the conventional approach deployment of FIG. 2. For a number N of remote sites, the FIG. 2 deployment requires 2N transceivers and 2N dedicated OSC wavelengths. N variants of OSC OAD filter are required, a different filter for each remote site, the filter corresponding to the pair of OSC wavelengths used for that particular remote site. In the system 900 of FIG. 10, for the same number N of remote sites, 3 OSC wavelengths are used and N+1 OSC transceivers are required. Four variants of OSC filter are required for the system. The system 900 represents a saving of 2N−3 OSC wavelengths, N−1 OSC transceivers and N−4 filter variants. The savings offered by the system 900 thus increase with the number N of remote sites. In addition, new remote sites may easily be added into the system of FIG. 10 without making any changes to the main site, simply inserting the new remote sites into the daisy chain configuration with an appropriate variant of OAD filter and transceiver. The number of remote sites that may be included in an initial deployment, or added at a later time, is not limited by spectrum availability, only three wavelengths being required for OSC signalling regardless of the number of remote sites. An additional advantage offered by examples of the present disclosure arises from the fact that internal remote-to-remote site connections are typically shorter than connections between main and remote sites. Less powerful OSC transceivers may therefore be used at the remote sites for sending and receiving OSC signals via the hub node over remote-to-remote connections in the daisy chain. The daisy chain routing of OSC signals according to the present disclosure is largely achieved through actions at the hub node, and thus via the addition of passive optical components which may be integrated with existing splitter sites without adding complexity to the conventional approach deployment. The remote-to-remote daisy chain routing may also provide easier support for remote-to-remote node communication, for example for advanced radio functions.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope. References to DWDM or CWDM may alternatively refer to any WDM optical signal.

The invention claimed is:

1. A method for facilitating Optical Supervisory Channel (OSC) communications between a main site and a plurality of remote sites in an optical network; wherein the main and remote sites are comprised within a Radio Access Network; wherein the main and remote sites are connected via a point to multipoint optical infrastructure; the method comprising:
  receiving an OSC signal on an OSC from the main site;
  sequentially routing OSC signals on the OSC to each of the remote sites in a daisy chain configuration; and
  returning an OSC signal received on the OSC from a last of the remote sites in the daisy chain configuration to the main site;
  wherein the OSC is transported over the point to multipoint optical infrastructure.

2. The method of claim 1, wherein the sequentially routing OSC signals on the OSC to each of the remote sites in a daisy chain configuration comprises:
  forwarding an OSC signal on the OSC to an nth remote site in the daisy chain configuration;
  receiving an OSC signal from the nth remote site in the daisy chain configuration; and
  forwarding the received OSC signal from the nth remote site to an n+1 th remote site in the daisy chain configuration without returning the received OSC signal to the main site.

3. The method of claim 1:
  wherein the optical network comprises a hub node;
  wherein the point to multipoint optical infrastructure comprises a bidirectional single fiber connection between the main site and the hub node and bidirectional single fiber connections between the hub node and each of the remote sites.

4. The method of claim 3, wherein the method is performed by the hub node.

5. The method of claim 1:
  wherein the main site comprises a Radio Equipment Control (REC) site; and
  wherein the remote sites comprise Radio Equipment (RE) sites.

6. The method of claim 1:
  wherein the receiving the OSC signal on the OSC from the main site comprises receiving the OSC signal on a first wavelength; and
  wherein the sequentially routing OSC signals on the OSC to each of the remote sites in a daisy chain configuration comprises forwarding an OSC signal received on the OSC from an nth remote site to an n+1 th remote site in the daisy chain configuration on the same wavelength on which the OSC signal was received from the nth remote site, the wavelength being one of the first wavelength or a second wavelength.

7. The method of claim 1, further comprising:
receiving a Dense Wavelength Division Multiplexing (DWDM) signal from at least one of the remote sites; and
forwarding the received DWDM signal received from at least one of the remote sites to the main site.

8. A hub node for an optical network the optical network comprising a main site and a plurality of remote sites; wherein the main and remote sites are comprised within a Radio Access Network; wherein the main and remote sites are connected via a point to multipoint optical infrastructure; the hub node comprising:
an Optical Supervisory Channel (OSC) routing element configured to:
receive an OSC signal on an OSC from the main site;
sequentially route OSC signals on the OSC to each of the remote sites in a daisy chain configuration; and
return an OSC signal received on the OSC from a last of the remote sites in the daisy chain configuration to the main site;
wherein the OSC routing element is configured to receive, route and return OSC signals on the OSC over the point to multipoint optical infrastructure.

9. The hub node of claim 8, wherein the OSC routing element comprises a passive optical element.

10. The hub node of claim 8, wherein the OSC routing element comprises a plurality of Optical Add/Drop (OAD) filters.

11. The hub node of claim 8:
wherein the optical network comprises N remote sites connected to the hub node; and
wherein the OSC element comprises at least N single channel Optical Add/Drop (OAD) filters and at least N−2 band separation OAD filters.

12. The hub node of claim 11, wherein each single channel OAD filter is configured to:
filter out an OSC signal received on the OSC; and
forward the received OSC signal on the OSC toward the next remote unit in the daisy chain configuration.

13. The hub node of claim 11, wherein each band separation filter is configured to add an OSC signal received on the OSC from an nth remote site to a Dense Wavelength Division Multiplexing (DWDM) signal received from the main site for forwarding to the n+1 th remote site in the daisy chain configuration, the DWDM signal being transported over the point to multipoint optical infrastructure.

14. The hub node of claim 8:
wherein the main site comprises a Radio Equipment Control (REC) site; and
wherein the remote sites comprise Radio Equipment (RE) sites.

15. The hub node of claim 8, further comprising a splitter element configured to receive a Dense Wavelength Division Multiplexing (DWDM) signal from the main site and to forward at least a part of the DWDM signal to the remote sites.

* * * * *